(12) United States Patent
Neu et al.

(10) Patent No.: US 10,435,067 B2
(45) Date of Patent: Oct. 8, 2019

(54) INDEPENDENT SUSPENSION SYSTEM WITH A HIGH STEERING ANGLE

(71) Applicant: ZF Friedrichshafen AG, Friedrichshafen (DE)

(72) Inventors: Alexander Neu, Friedrichshafen (DE); Heinz-Joachim Gilsdorf, Donnersdorf (DE); Christian Förster, Aachen (DE); Tom Lehmkuhl, Aachen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/532,644

(22) PCT Filed: Jan. 27, 2016

(86) PCT No.: PCT/EP2016/051616
§ 371 (c)(1),
(2) Date: Jun. 2, 2017

(87) PCT Pub. No.: WO2016/139014
PCT Pub. Date: Sep. 9, 2016

(65) Prior Publication Data
US 2018/0251152 A1 Sep. 6, 2018

(30) Foreign Application Priority Data

Mar. 2, 2015 (DE) .................. 10 2015 203 632

(51) Int. Cl.
*B62D 7/20* (2006.01)
*B60G 3/20* (2006.01)
(Continued)

(52) U.S. Cl.
CPC .............. *B62D 7/20* (2013.01); *B60G 3/20* (2013.01); *B62D 7/06* (2013.01); *B62D 7/09* (2013.01);
(Continued)

(58) Field of Classification Search
CPC ..... B62D 7/00; B62D 7/09; B62D 7/06; B60G 3/20; B60G 2204/424; B60G 2500/40; B60G 2200/44; B60G 2200/144
See application file for complete search history.

(56) References Cited

U.S. PATENT DOCUMENTS 3,485,506 A * 12/1969 Melbar .................. B62D 7/14
280/124.103
4,202,563 A * 5/1980 Tattermusch ............ B60G 3/20
280/124.138
(Continued)

FOREIGN PATENT DOCUMENTS

DE 10 2004 003 395 A1 8/2005
DE 10 2004 053 722 A1 5/2006
(Continued)

OTHER PUBLICATIONS

German Search Report Corresponding to 10 2015 203 632.4 dated Feb. 18, 2016.
(Continued)

*Primary Examiner* — Paul N Dickson
*Assistant Examiner* — Timothy Wilhelm
(74) *Attorney, Agent, or Firm* — Davis & Bujold PLLC; Michael J. Bujold

(57) ABSTRACT

A wheel suspension system (101) with at least one wheel support (103), first and second coupling rods (105, 107) and at least one track rod (109). The first and second coupling rods (105, 107) are connected to one another in an articulated manner. The second coupling rod (107) and the wheel support (103) are connected to one another in an articulated manner. The track rod (109) is designed to apply a steering torque to the first coupling rod (105). The steering torque is transmitted from the first coupling rod (105), via the second coupling rod (107), to the wheel support (103). The wheel suspension system has at least one suspension link (111)

(Continued)

which is mounted, in an articulated manner, on a vehicle body or chassis and is articulated to the wheel support (103). The suspension link (111) and the first coupling rod (105) are articulated to one another.

7 Claims, 1 Drawing Sheet

(51) Int. Cl.
*B62D 7/06* (2006.01)
*B62D 7/09* (2006.01)

(52) U.S. Cl.
CPC .... *B60G 2200/144* (2013.01); *B60G 2200/44* (2013.01); *B60G 2204/424* (2013.01); *B60G 2500/40* (2013.01)

(56) References Cited

U.S. PATENT DOCUMENTS

| | | | | | |
|---|---|---|---|---|---|
| 4,522,418 | A * | 6/1985 | Struck | ...................... | B62D 7/16 280/93.507 |
| 4,941,677 | A * | 7/1990 | Matsumoto | .............. | B60G 3/26 280/124.138 |
| 5,388,855 | A * | 2/1995 | Yamamoto | ............... | B60G 3/20 280/124.138 |
| 6,325,396 | B1 * | 12/2001 | Romig | ..................... | B60G 9/02 280/103 |
| 6,511,078 | B2 * | 1/2003 | Sebe | ........................ | B60G 3/01 280/124.103 |
| 7,389,998 | B2 * | 6/2008 | Kondo | ................... | B60G 7/008 280/5.52 |
| 7,562,884 | B2 * | 7/2009 | Saibold | .................... | B62D 7/09 280/93.502 |
| 7,617,907 | B2 * | 11/2009 | Mair | ....................... | B62D 7/09 180/434 |
| 9,387,881 | B2 * | 7/2016 | Smith | ...................... | B62D 7/16 |
| 2003/0155735 | A1 * | 8/2003 | Takahashi | ............ | B60K 17/303 280/93.51 |

FOREIGN PATENT DOCUMENTS

| | | |
|---|---|---|
| DE | 60 2004 002 248 T2 | 8/2007 |
| DE | 10 2013 216 029 A1 | 2/2015 |

OTHER PUBLICATIONS

International Search Report Corresponding to PCT/EP2016/051616 dated Apr. 18, 2016.
Written Opinion Corresponding to PCT/EP2016/051616 dated Apr. 18, 2016.

\* cited by examiner

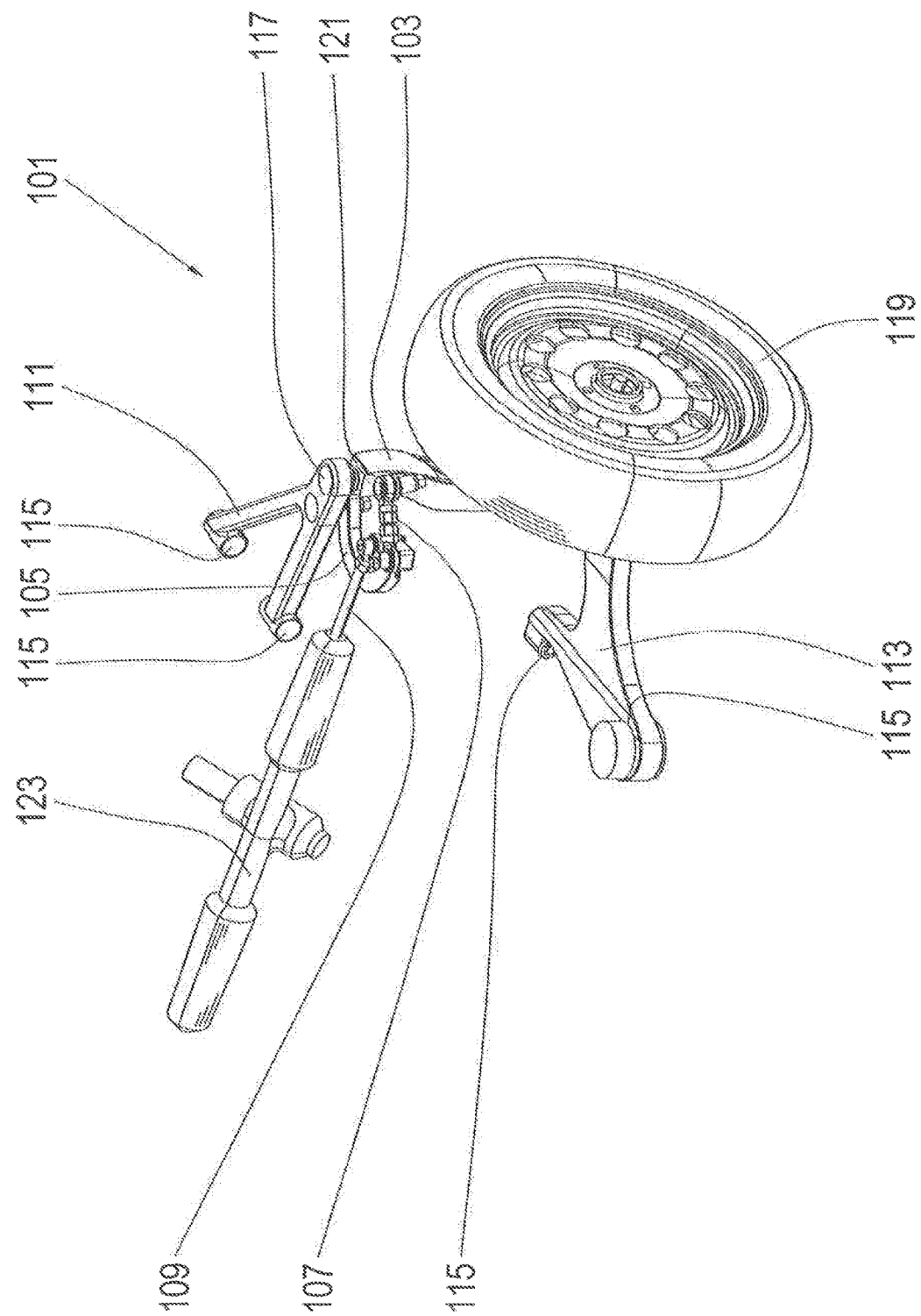

INDEPENDENT SUSPENSION SYSTEM WITH A HIGH STEERING ANGLE

This application is a National Stage completion of PCT/EP2016/051616 filed Jan. 27, 2016, which claims priority from German patent application serial no. 10 2015 203 632.4 filed Mar. 2, 2015.

FIELD OF THE INVENTION

The invention concerns a suspension system.

BACKGROUND OF THE INVENTION

In order to reduce the minimum turning circle of a road vehicle with a given chassis geometry, the maximum steering angle must be increased. However, the steering angle is limited by the steering kinematics among other things.

From the document DE 10 2004 053 722 A1 a steering mechanism for building-site vehicles is known. In this case a track rod acts upon a wheel support via a four-element linkage transmission. A rigid axle or a vehicle chassis, the wheel support and two coupling rods form the elements of the linkage transmission.

SUMMARY OF THE INVENTION

The purpose of the present invention is to make available a wheel suspension system which avoids the disadvantages inherent in the systems known from the prior art. In particular, in a vehicle with independent wheel suspension the minimum turning circle should be made smaller.

This objective is achieved with a wheel suspension system according to the claims.

A wheel suspension system is understood to be a device for connecting at least one wheel to a vehicle body and/or a vehicle chassis. As a rule the connection is spring mounted and, particularly in the case of a front axle, also steerable. Thus, the wheel suspension system connects the wheel support to the vehicle body and/or the vehicle chassis in such manner that a wheel mounted to rotate on the wheel support is sprung and if necessary steerable.

The wheel suspension system according to the present invention comprises at least one wheel support, a first coupling rod, a second coupling rod and at least one track rod.

The track rod is part of a steering mechanism and serves to transmit a steering torque to the wheel support. During steering, the track rod undergoes translational movement or displacement at least partially in the transverse direction of the vehicle. Thus, during steering a component of the movement of the track rod is directed in the transverse direction of the vehicle. The transverse direction of the vehicle is understood to be a direction perpendicular to the longitudinal direction running horizontally. The longitudinal direction of the vehicle coincides with the travel direction when driving straight ahead.

A coupling rod is understood to be a rod connected in an articulated manner to two other components.

An articulated connection of two components is a connection of the two components by means of a hinged joint in such manner that the two components can be rotated relative to one another about at least one rotational axis. Thus, there can be articulated connections about just one rotational axis, about exactly two rotational axes and about exactly three rotational axes. An articulated connection does not allow any translational movement of the two components relative to one another.

The first coupling rod and the second coupling rod of the wheel suspension system according to the invention are connected to one another in an articulated manner.

Furthermore, the two coupling rods and the wheel support are articulated to one another. For that purpose the wheel support can form a track-rod arm, such that the second coupling rod and the track-rod arm are articulated to one another. Between the track-rod arm and the rest of the wheel support there is a rigid connection, i.e. a connection which allows no relative movement. In particular the wheel support, including the track-rod arm, can be made integrally as one piece.

The steering torque is not transmitted to the wheel support directly, but by way of the first coupling rod. Correspondingly, the track-rod arm is designed to apply the steering torque to the first coupling rod. From the first coupling rod, the steering torque is transmitted to the wheel support by way of the second coupling rod. The first coupling rod and the second coupling rod are thus in a torque flow path of the steering torque from the track-rod arm to the wheel support, and participate in the transmission of the steering torque.

The wheel suspension is designed as an independent wheel suspension system. Correspondingly, the wheel suspension system comprises at least one suspension link which, in contrast to a rigid axle, is mounted on the vehicle body or the vehicle chassis in an articulated manner. Thus, the suspension link is mounted so that it can swivel or pivot on the vehicle body or vehicle chassis. Between the suspension link and the vehicle body or vehicle chassis there is no translational movement degree of freedom and at least one rotational degree of freedom. Thus, there can be just one rotational degree of freedom, or exactly two rotational degrees of freedom, or exactly three rotational degrees of freedom. In addition, the suspension link is connected to the wheel support in an articulated manner.

The first coupling rod is mounted in the suspension link in an articulated manner. Thus, the suspension link and the first coupling rod are articulated to one another.

Accordingly, the first coupling rod, the second coupling rod, the suspension link and the wheel support each form an element of a four-element linkage transmission. The articulated connection of the first coupling rod to the suspension arm makes it possible to use a linkage transmission of this type as the steering mechanism of an independent wheel suspension.

The track rod can be connected to the first coupling rod either directly or indirectly. In a preferred further development of the wheel suspension system, between the track rod and the first coupling rod there is a direct connection. The track rod and the first coupling rod are then articulated to one another. This means that a first half of an articulation joint is connected rigidly to the track rod and a second half of the same joint is connected rigidly to the first coupling rod. Thus, by virtue of the articulation joint the first coupling rod is acted upon by the steering torque. In turn, the track rod acts upon the joint with the steering torque.

Alternatively, the wheel suspension system is further developed in such manner that the track rod is connected to the first coupling rod by way of a lever element. For that purpose the lever element and the first coupling rod are connected rigidly to one another. In particular a one-piece component can be provided, which forms the lever element and the first coupling rod. The track rod is articulated to the lever element. Thus, the track rod transmits the steering torque to the lever element. Owing to the rigid connection between the lever element and the first coupling rod, the first coupling element is therefore acted upon by the steering torque.

The pivoting of the first coupling rod relative to the suspension link takes place about a first pivot point. During the pivoting, the position of the pivot point relative to the first coupling rod and to the suspension link is fixed. In particular, the first pivot point can be a point on a rotational axis. If the coupling rod and the suspension link are connected by a ball joint, a ball mid-point of that joint forms the first pivot point.

The articulated connection between the suspension link and the wheel support allows pivoting of the two components relative to one another about a second pivot point. The second coupling rod and the wheel support can pivot relative to one another about a third pivot point.

At a first point of application, the track rod can apply a steering torque to the first coupling rod. The point of application is a pivot point about which the track rod can pivot relative to the first coupling rod. Thus, during the pivoting, the first point of application does not move relative to the track rod and to the first coupling rod. A force that the track rod applies on the first coupling rod and which produces the steering torque acting on the first coupling rod, passes through the first point of application.

The steering torque acting in the first coupling rod is transmitted to a second point of application on the second coupling rod. The second point of application also does not move relative to the first coupling rod and the second coupling rod during the pivoting of the first and second coupling rods. A force involved with the transmission of the steering torque from the first coupling rod to the second coupling rod passes through the second point of application.

The first pivot point, the second pivot point, the third pivot point and the second point of application are so arranged that they form the corners of a rectangle. In particular the first pivot point, the second pivot point, the third pivot point and the second point of application are separated in pairs from one another.

A steering kinematic which is particularly advantageous in relation to a high steering angle, can be produced if a distance between the first pivot point and the first point of application is smaller than a distance between the first pivot point and the second point of application. Thus, the steering rod applies the steering torque to a first lever mounted to swivel in the suspension link, which is shorter than a second lever mounted to swivel in the suspension link, which transmits the steering torque to the second coupling rod.

Preferably the first pivot point, the first point of application and the second point of application are arranged along a straight line.

In a particularly preferred further development, the first coupling rod has a curvature between the first pivot point and the first point of application. A curvature means a local deviation of a curve from a straight line. Thus, between the first pivot point and the first point of application the first coupling rod follows a curve which deviates from a straight line. With such a shape of the first coupling rod, high steering angles can be achieved, without the first coupling rod colliding with the wheel support or the track-rod arm.

Furthermore, the wheel suspension system is preferably developed further with a triangular wishbone which functions as the above-mentioned suspension link. Moreover, a further triangular wishbone can be provided for guiding the wheel support.

In particular, the wheel suspension can be formed mirror-symmetrically relative to a vertically directed mirror plane extending centrally in the longitudinal direction of the vehicle.

BRIEF DESCRIPTION OF THE DRAWINGS

A preferred example embodiment is illustrated in the sole FIGURE. In this, the same indexes denote the same or functionally equivalent features.

In detail, the sole FIGURE shows a wheel suspension system.

DETAILED DESCRIPTION OF THE PREFERRED EMBODIMENTS

The wheel suspension system 101 in the FIGURE comprises a wheel support 103, a first coupling rod 105, a second coupling rod 107 and a track rod 109. A first triangular wishbone 111 and a second triangular wishbone 113 guide the wheel support 103 in a sprung and steerable manner. For that purpose the first triangular wishbone 111 and the second triangular wishbone are in each case fixed in two bushings 115 in a vehicle body.

In each case a respective ball joint 117 connects the first triangular wishbone 111 and the second triangular wishbone 113 to the wheel support 103. Through the two ball joints 117 passes a steering axis, about which the wheel support 103 can swivel.

A wheel 119 is fitted to rotate on the wheel support 103.

Part of the wheel support 103 is designed as a track-rod arm 121. The track-rod arm 121, together with the first coupling rod 105, the second coupling rod 107, the first triangular wishbone 111, the track rod 109 and a linkage transmission 123, form a steering mechanism.

By means of the linkage transmission 123, the track rod 109 can be displaced in translation transversely to the travel direction. The track rod 109 does not act directly, as is usual, upon the wheel support 103 but actuates a linkage transmission formed by the first coupling rod 105, the second coupling rod 107, the first triangular wishbone 111 and the track-rod arm 121. In this way high steering angles of the wheel 119 can be produced.

INDEXES

101 Wheel suspension system
103 Wheel support
105 First coupling rod
107 Second coupling rod
109 Track rod
111 First triangle wishbone
113 Second triangle wishbone
115 Bushing
117 Ball joint
119 Wheel
121 Track-rod arm
123 Linkage transmission

The invention claimed is:
1. A wheel suspension system comprising:
at least one wheel support which supports a wheel such that the wheel rotates about a rotational axis that extends perpendicular to a longitudinal travel direction of the vehicle,
a first coupling rod,
a second coupling rod, and
at least one track rod;

the first coupling rod and the second coupling rod being connected to one another in an articulated manner;

the second coupling rod and the wheel support also being connected to one another in an articulated manner;

the track rod being designed to apply steering torque to the first coupling rod;

the steering torque being transmitted from the first coupling rod, via the second coupling rod, to the wheel support;

an upper suspension link being mounted on either a vehicle body or a vehicle chassis in an articulated manner such that the upper suspension link is vertically located above the rotational axis of the wheel, and the upper suspension link being connected to the wheel support in an articulated manner; and the upper suspension link and the first coupling rod being connected to one another in an articulated manner by a first pivot point that is fixed in position relative to the upper suspension link and the first coupling rod.

2. The wheel suspension system according to claim 1, wherein the track rod and the first coupling rod are connected to one another in an articulated manner.

3. The wheel suspension system according to claim 1, further comprising a lever element;
the lever element and the first coupling rod are rigidly connected to one another; and
the track rod and the lever element are connected to one another in an articulated manner.

4. The wheel suspension system according to claim 1, further comprising at least one triangular wishbone, and the triangular wishbone forms the upper suspension link, the first coupling rod being vertically located below the triangular wishbone.

5. A wheel suspension system comprising:
at least one wheel support which supports a wheel such that the wheel rotates about a rotational axis that extends perpendicular to a longitudinal travel direction of the vehicle,
a first coupling rod,
a second coupling rod, and
at least one track rod;
the first coupling rod and the second coupling rod being connected to one another in an articulated manner;
the second coupling rod and the wheel support also being connected to one another in an articulated manner;
the track rod being designed to apply steering torque to the first coupling rod;
the steering torque being transmitted from the first coupling rod, via the second coupling rod, to the wheel support;
an upper suspension link being mounted on either a vehicle body or a vehicle chassis in an articulated manner such that the upper suspension link is vertically located above the rotational axis of the wheel, and the upper suspension link being connected to the wheel support in an articulated manner;
the upper suspension link and the first coupling rod being connected to one another in an articulated manner;
the first coupling rod is pivotable relative to the upper suspension link about a pivot point;
the track rod can apply the steering torque to the first coupling rod at a first point of application;
the first coupling rod transmits the steering torque to the second coupling rod at a second point of application; and
a distance between the pivot point and the first point of application is smaller than a distance between the pivot point and the second point of application such that, with respect to the longitudinal travel direction, the first point of application is located behind the second point of application.

6. The wheel suspension system according to claim 5, wherein the first coupling rod is curved between the pivot point and the first point of application, and the first pivot point, the first point of application and the second point of application are arranged along a straight line, and the first point of application being located along the straight line between the first pivot point and the second point of application.

7. A wheel suspension system comprising:
a wheel support which supports a wheel such that the wheel rotates about a rotational axis that extends perpendicular to a horizontal straight ahead travel direction of the vehicle,
first and second coupling rods;
a track rod;
one end of the first coupling rod being connected to one end of the second coupling rod such that the first and the second coupling rods being pivotable with respect to one another about a first pivot point;
an opposite end of the second coupling rod being connected to the wheel support such that the second coupling rod and the wheel support being pivotable with respect to one another about a second pivot point;
one end of the track rod being connected to the one end of the first coupling rod such that the track rod and the first coupling rod being pivotable with respect to one another about a third pivot point, the track rod applying a steering torque to the first coupling rod, and the first coupling rod transmitting the steering torque, via the second coupling rod, to the wheel support such that the wheel support is pivoted about a steering axis;
at least one suspension link having bushings which are connected to either a vehicle body or a vehicle chassis such that the suspension link is vertically supported above the rotational axis of the wheel and is pivotable about a rotational axis with respect to the vehicle body or the vehicle chassis;
an end of the suspension link opposite the bushings being connected to the wheel support along the steering axis such that the wheel support is vertically located below the suspension link and is pivotable about the steering axis with respect to the suspension link; and
an opposite end of the first coupling rod being connected at a fourth pivot point to the suspension link such that the first coupling rod is vertically located below the suspension link, the first coupling rod and the suspension link are pivotable relative to each other about the fourth pivot point, and a distance from the third pivot point to the fourth pivot point being shorter than a distance from the first pivot point to the fourth pivot point such that, in relation to the horizontal straight ahead travel direction of the vehicle, the first pivot point is located in front of the third pivot point.

* * * * *